(12) United States Patent
Willerton

(10) Patent No.: US 9,376,057 B2
(45) Date of Patent: Jun. 28, 2016

(54) LIGHTING STRUCTURE

(71) Applicant: Nissan North America, Inc., Franklin, TN (US)

(72) Inventor: Joshua Blake Willerton, West Bloomfield, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 184 days.

(21) Appl. No.: 14/192,514

(22) Filed: Feb. 27, 2014

(65) Prior Publication Data

US 2015/0239394 A1 Aug. 27, 2015

(51) Int. Cl.
  B60Q 1/00 (2006.01)
  B60Q 1/26 (2006.01)
  B60Q 3/02 (2006.01)
  B60Q 3/00 (2006.01)

(52) U.S. Cl.
  CPC .............. *B60Q 3/0203* (2013.01); *B60Q 3/002* (2013.01); *B60Q 3/004* (2013.01); *B60Q 3/0289* (2013.01)

(58) Field of Classification Search
  CPC ..... B60Q 3/0203; B60Q 3/0289; B60Q 3/002
  USPC .......................... 362/488, 489, 490, 491, 492
  See application file for complete search history.

(56) References Cited

U.S. PATENT DOCUMENTS

| | | | | |
|---|---|---|---|---|
| 3,875,478 A * | 4/1975 | Capstick | .................. | H01L 23/48 257/774 |
| 4,840,334 A * | 6/1989 | Kikuchi | ..................... | F16L 3/13 24/453 |
| 5,678,914 A * | 10/1997 | Dealey | ..................... | B60Q 3/06 362/485 |
| 6,152,586 A * | 11/2000 | Dealey, Jr. | ............. | B60Q 3/004 362/459 |
| 6,594,417 B1 * | 7/2003 | Hulse | ..................... | B60Q 3/004 362/487 |
| 6,974,238 B2 * | 12/2005 | Sturt | ..................... | B60Q 3/004 257/89 |
| 7,210,829 B2 | 5/2007 | Okazaki et | | |
| 7,507,008 B2 | 3/2009 | Clauw et al. | | |
| 7,938,566 B2 | 5/2011 | Ishida et al. | | |
| 8,075,173 B2 | 12/2011 | Shallcross et al. | | |
| 2001/0006465 A1 * | 7/2001 | Misawa | ............... | B60Q 3/0233 362/501 |
| 2007/0177397 A1 | 8/2007 | Sakakibara et al. | | |
| 2010/0080010 A1 | 4/2010 | Marui et al. | | |
| 2010/0277946 A1 * | 11/2010 | Shallcross | .............. | B60Q 3/004 362/581 |
| 2011/0170304 A1 * | 7/2011 | Fujita | ..................... | B60Q 3/004 362/501 |
| 2013/0148370 A1 * | 6/2013 | Chang | .................. | B60Q 3/0289 362/509 |
| 2013/0155708 A1 * | 6/2013 | Moberg | ............... | B60Q 3/0233 362/488 |
| 2014/0043838 A1 * | 2/2014 | Mazur | .................... | B60Q 3/004 362/488 |
| 2015/0298604 A1 * | 10/2015 | Pfeil | ..................... | B60Q 3/0289 362/511 |

* cited by examiner

*Primary Examiner* — Anh Mai
*Assistant Examiner* — Glenn Zimmerman
(74) *Attorney, Agent, or Firm* — Global IP Counselors, LLP

(57) ABSTRACT

A lighting structure for a vehicle includes a first portion and a second portion. The first portion includes a retaining structure configured to retain an elongated lighting element, and a fastening structure configured to attach the lighting structure to an interior vehicle panel. The second portion is attached to the first portion at a location spaced from the retaining structure, with a distal end of the second portion being spaced from the retaining structure such that the second portion conceals the retaining structure in a longitudinal direction of a vehicle when the lighting structure is attached to the interior vehicle panel.

22 Claims, 9 Drawing Sheets

LIGHTING STRUCTURE

BACKGROUND

1. Field of the Invention

The present invention generally relates to a lighting structure. More specifically, the present invention relates to a lighting structure that produces ambient light for the interior of a vehicle.

2. Background Information

Conventional ambient lighting designs are known that use extruded light pipes or light strings. Many of these designs are difficult to assemble, require significant tooling costs and/or do not protect the lighting structure during vehicle manufacturing. For example, one conventional lighting design requires installation of a light pipe directly to the instrument panel. A finishing piece is then attached to the panel that covers the light pipe. This design is difficult to assemble and does not protect the lighting assembly during the vehicle manufacturing process.

In another conventional design, an injected light pipe assembly is compressed between an interior finisher and an exterior finisher with the exterior finisher being coupled to the instrument panel of a vehicle. This design however, requires a pre-formed lighting assembly which has high tooling costs.

In another conventional design, a flexible light string is contained inside a protective box. This protective box is not cost effective.

It is therefore apparent that a need exists for an improved lighting structure for the passenger compartment of a vehicle.

SUMMARY

An object of the invention is to produce a cost effective and easy to manufacture ambient lighting system that can be installed at any location within the interior of a vehicle.

In view of the state of the known technology, the present disclosure is directed to a lighting structure that includes a first portion and a second portion. The first portion includes a retaining structure configured to retain an elongated lighting element, and a fastening structure configured to attach the lighting structure to an interior vehicle panel. The second portion is attached to the first portion at a location spaced from the retaining structure, with a distal end of the second portion being spaced from the retaining structure such that the second portion conceals the retaining structure in a longitudinal direction of a vehicle when the lighting structure is attached to the interior vehicle panel.

In another embodiment, an interior vehicle structure comprises an interior trim panel, an elongated lighting element, a first portion and a second portion. The first portion includes a fastening structure attached to the interior trim panel. The first portion includes a retainer structure that retains the elongated lighting element on the first portion. The second portion is attached to the first portion so as to be spaced from the elongated lighting element and substantially conceal the elongated lighting element in a longitudinal direction of the vehicle. A distal end of the second portion is spaced from the interior trim panel so as to enable light from the elongated lighting element to pass between the distal end and the interior trim panel.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
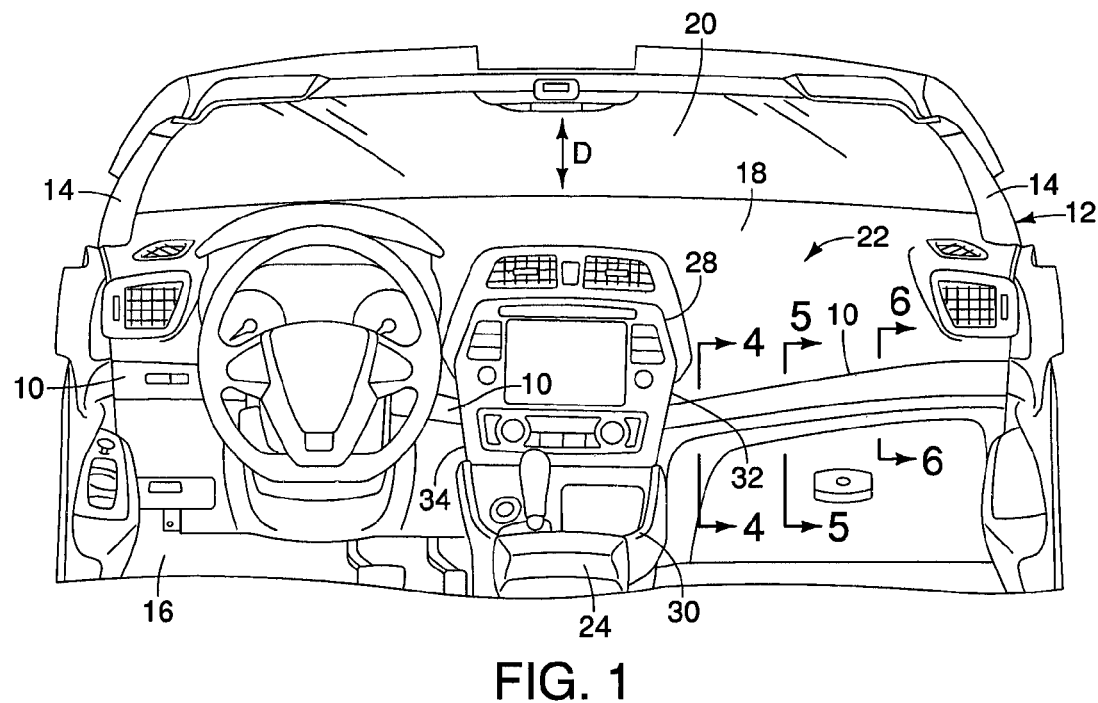
FIG. 1 is a rear view of the lighting structure according to one embodiment installed in the passenger compartment of a vehicle.
Figure 2:
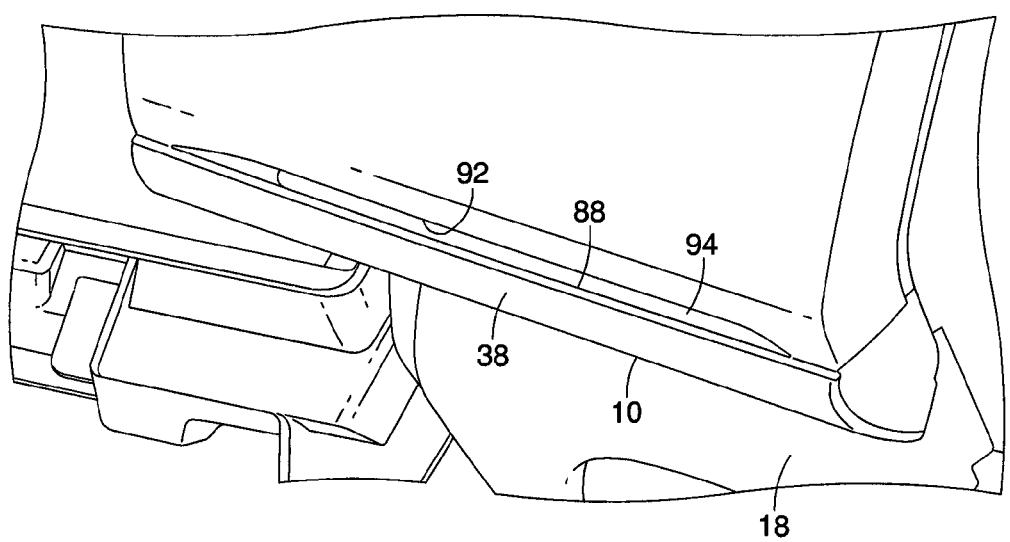
FIG. 2 is an inverted, upward perspective view of the lighting structure illustrated in FIG. 1.

Referring initially to FIGS. 1 and 2, a lighting structure 10 of a vehicle 12 is illustrated in accordance with a first embodiment. The lighting structure 10 is positioned within the interior of the vehicle 12 and improves the interior design of the vehicle 12 by emitting ambient light in a predetermined direction.

Figure 3:
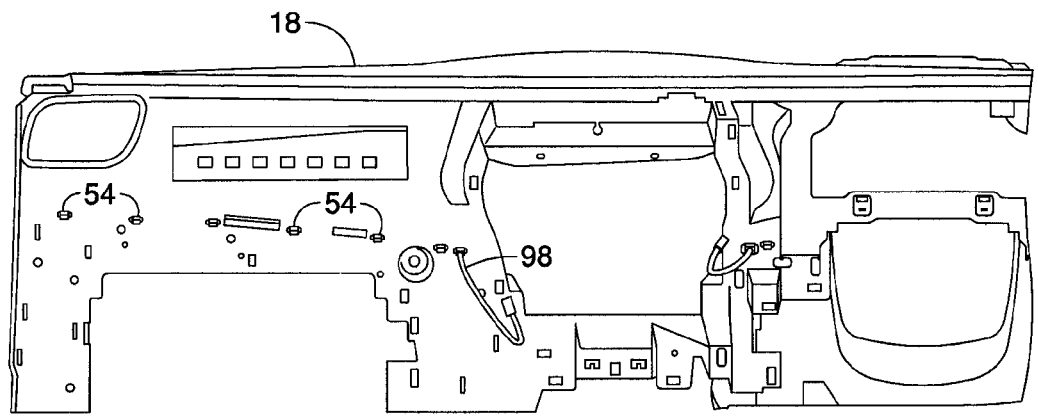
FIG. 3 is a front elevational view of an instrument panel of the vehicle with the lighting structure of FIG. 1 installed thereon.

As shown in FIGS. 1 and 3, the vehicle 12 generally includes A-pillars 14, a floor 16, an instrument panel 18 and a windshield 20 that at least partially define a passenger compartment 22 within the body structure of the vehicle 12. The vehicle 12 also includes, among other things, a center console 24 and the center stack assembly 28. The center console 24 is mounted to the floor 16 in a conventional manner, and includes a front section 30 that aligns with and can optionally connect to the center stack assembly 28.

As shown in FIGS. 1-4, the lighting structure 10 is disposed or installed on the instrument panel 18 in the interior of the vehicle 12, and can be disposed in various positions within passenger compartment 22. For example, in this embodiment, the lighting structure 10 is positioned on the right side 32 and left side 34 of the center stack assembly 28 along the instrument panel 18. The structure of each of the lighting structures 10 is generally the same, and therefore, only the structure of the lighting structure 10 on the right side 32 of the center stack assembly 28 will be discussed.

Figure 12:
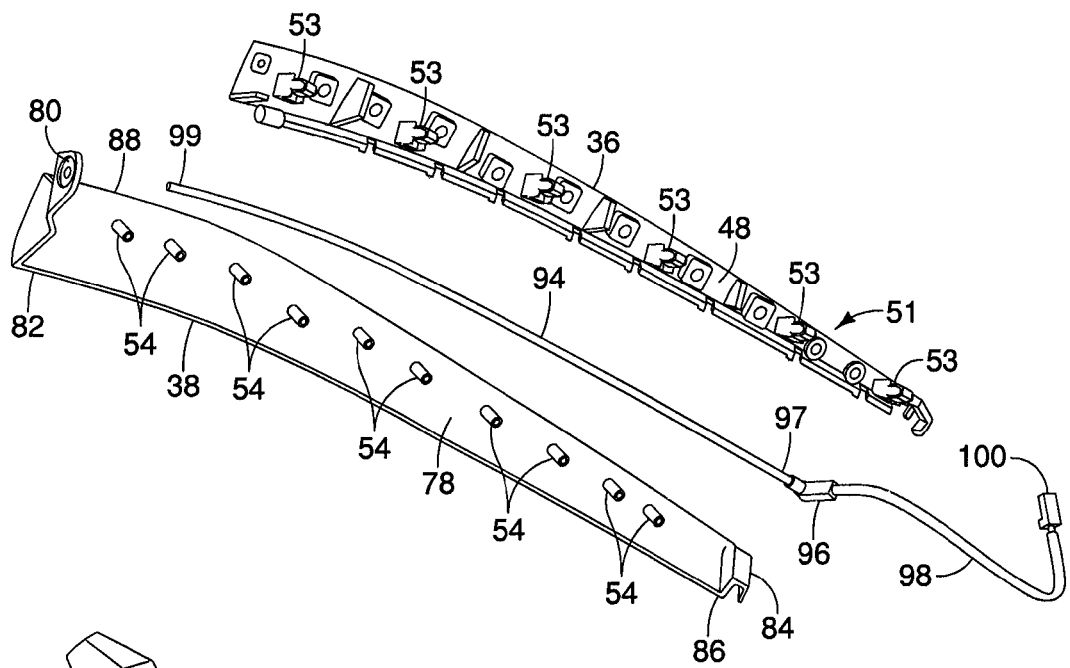
FIG. 12 is an exploded perspective view of the lighting structure illustrated in FIG. 1.
Figure 13:
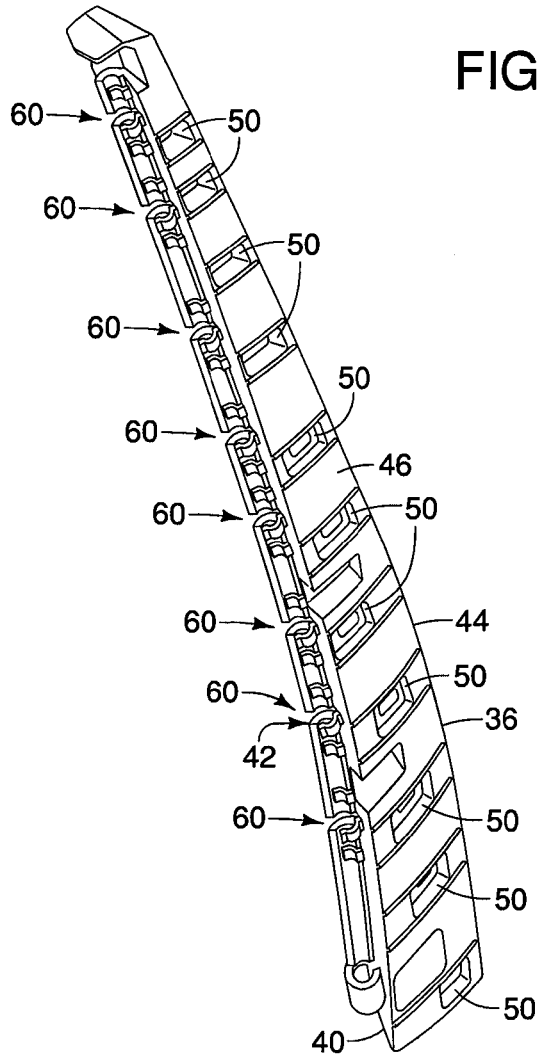
FIG. 13 is a top perspective view of the first portion of the lighting structure.
Figure 15:
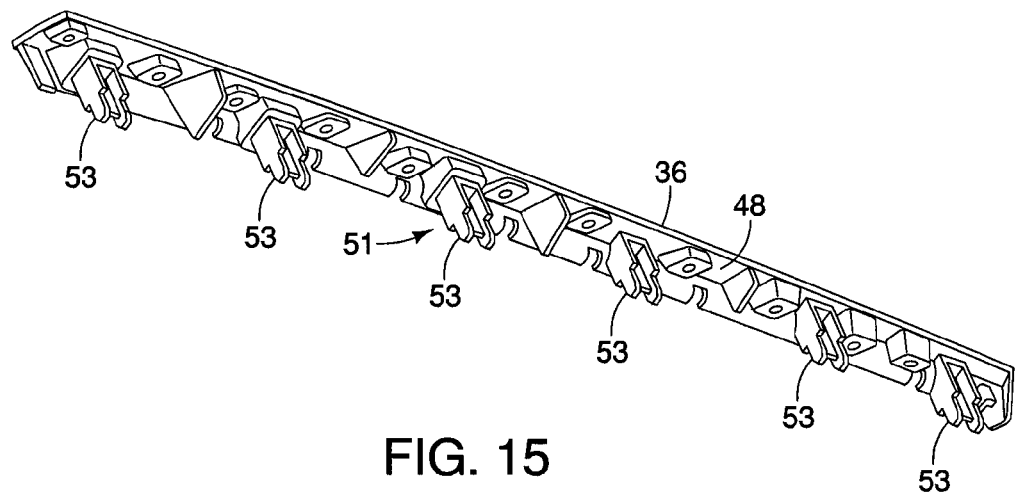
FIG. 15 is a bottom perspective view of the first portion of the lighting structure illustrated in FIG. 1.

In this embodiment, the lighting structure 10 includes a first portion 36 (an inner decorative finisher) and a second portion 38 (an outer decorative finisher). As shown in FIGS. 12, 13 and 15, the first portion 36 is an elongated trim member that is formed from plastic, or any other suitable material. The first portion 36 includes a base portion 40, a retaining structure 42 and an upright flange 44 extending from the base portion 40. The upright flange 44 has a first side 46 and a second side 48 and a plurality of openings 50 that extend through the upright flange 44 from the first side 46 to the second side 48. The openings 50 can be formed at various depths to match a contour of the instrument panel 18, as shown in FIGS. 13 and 15.

The second side 48 of the upright flange 44 includes a fastening structure 51 configured to attach the lighting structure 10 to the instrument panel 18, or any other suitable portion of the vehicle. As illustrated in FIGS. 3, 4, 12 and 15, fastening elements 53 of the fastening structure 51 extend substantially perpendicular to the second side 48 and can snap fit or be heat staked to the instrument panel 18. As shown specifically in FIGS. 3 and 4, the fastening elements 53 extend through openings in the instrument panel 18 to ensure that the lighting structure 10 is securely attached to the interior of the vehicle 12.

Figure 10:
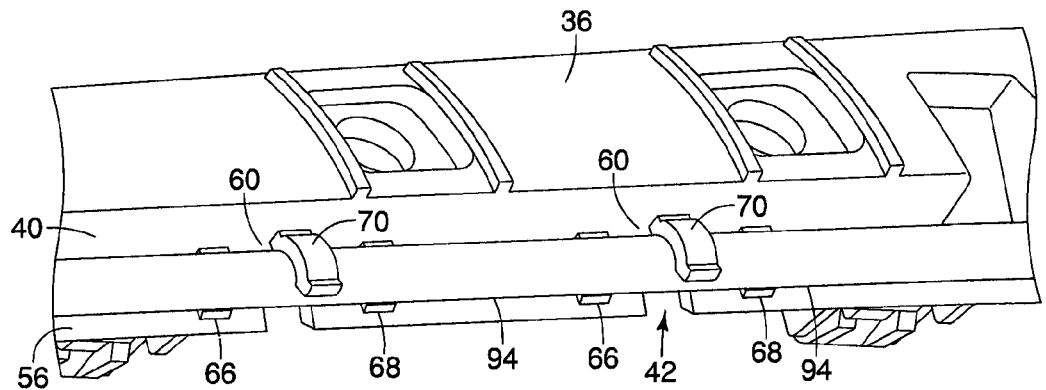
FIG. 10 is an enlarged view of the elongated lighting element coupled to the first portion of the lighting structure illustrated in FIG. 8.
Figure 14:
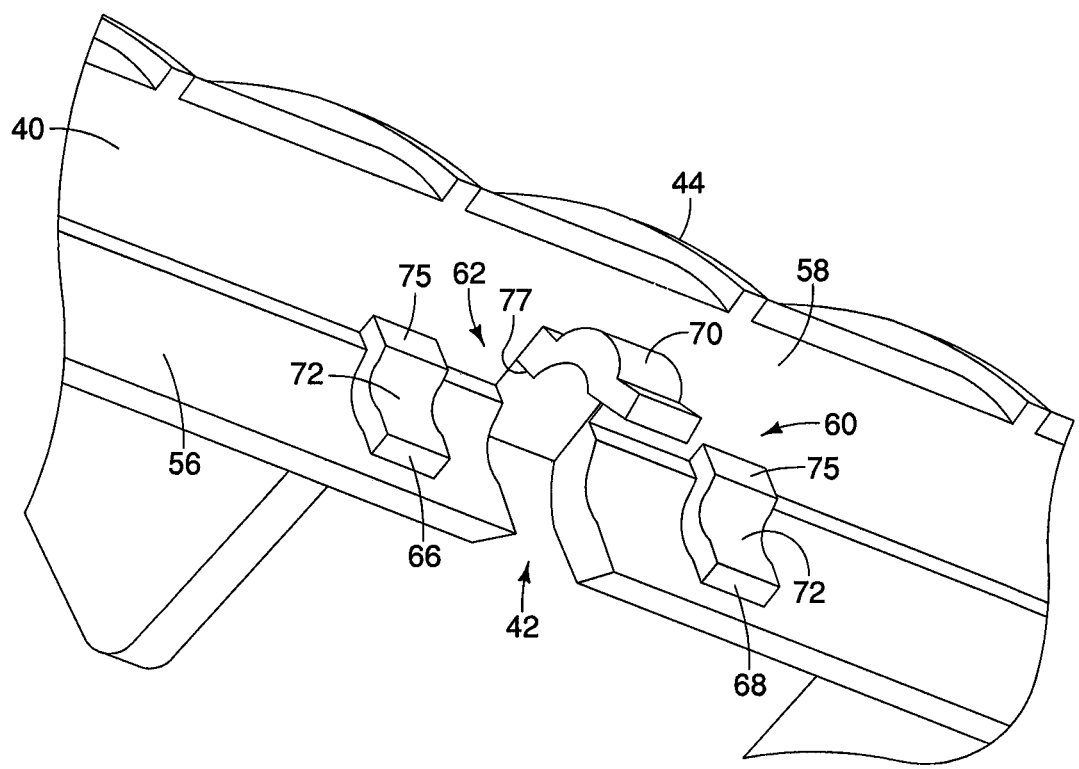
FIG. 14 is an enlarged view of the retaining structure of the first portion of the lighting structure illustrated in FIG. 1.

The retaining structure 42 is disposed along an underside face 58 of the base portion 40 and is configured to retain an elongated lighting element 94. In this embodiment, a lip 56 also extends from the underside face 58 of the base portion 40 and supports at least a portion of the retaining structure 42. As shown in FIGS. 10, 13 and 14, the retaining structure 42 includes a plurality of retainers 60 that define a locating groove 62 configured to receive a locating projection 64 on the elongated lighting element 94.

As shown in FIG. 14, the retaining structure 42 includes a first retaining member 66, a second retaining member 68 and a third retaining member 70. The first retaining member 66 is disposed on the lip 56 (i.e., a surface) of the base portion 40, the second retaining member 68 is disposed on the lip 56 (i.e., the surface) of the base portion 40 adjacent the first retaining member 66, and the third retaining member 70 is disposed directly on the underside face 50 of the base portion 40 spaced apart from and between the first and second retaining members 66 and 68. Each of the first, second and third retaining members 66, 68 and 70 has an arcuate contact surface 72 configured to mate with an outer contoured surface 74 of the elongated lighting element 94. Each of the first and second retaining members 66, 68 includes a first locating surface 75 and each of the third retaining members 70 includes a second locating surface 77. The locating projection 64 contacts the first and second locating surfaces 75, 77 when the locating projection 64 is received within the locating groove 62. Thus, the locating groove 62 is defined by the first and second locating surfaces 75, 77 and is disposed between the first retaining member 66 and the third retaining member 70 and between the second retainer member 68 and the third retaining member 70, as seen in FIG. 14.

Figure 8:
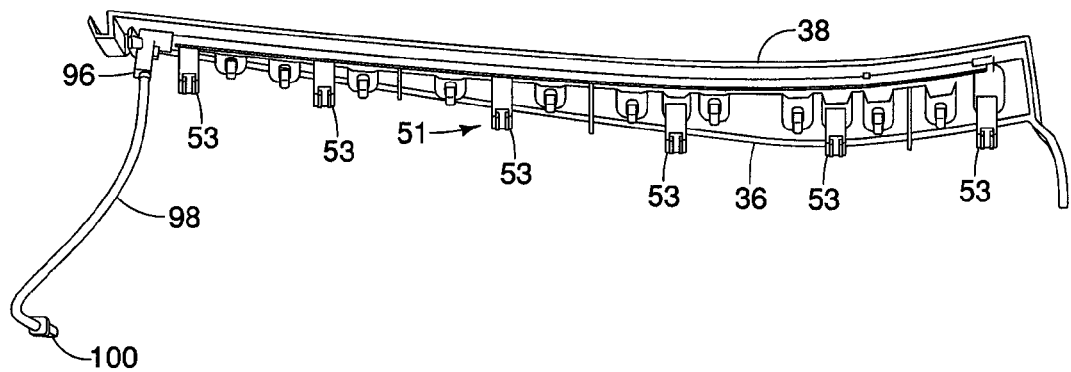
FIG. 8 is a perspective view of the lighting structure of FIG. 1.
Figure 16:
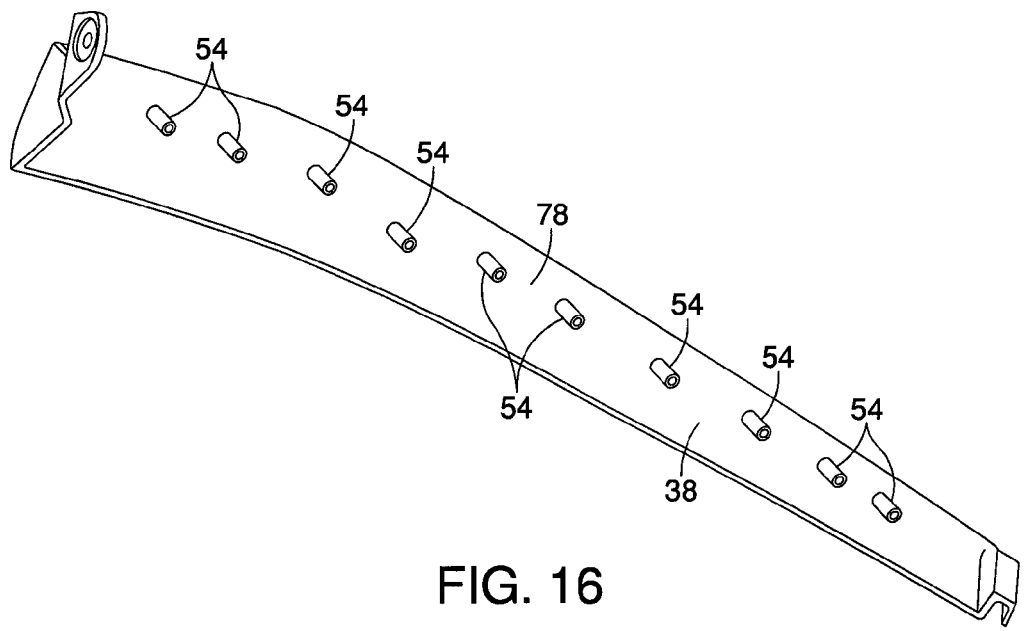
FIG. 16 is bottom perspective view of the second portion of the lighting structure illustrated in FIG. 1.

The second portion 38 is preferably a plastic elongated trim member that has a first side 76 and a second side 78. The first side 76 has a decorative finish that is viewed from the passenger compartment 22 of the vehicle 12. The second side 78 of the second portion 38 is configured to be attached to the upright flange 44 of the first portion 36 at a location spaced from the retaining structure 42. In particular, as shown in FIGS. 8, 12 and 16, fasteners 54 extend substantially perpendicularly from the second side 78. The fasteners 54 have a complimentary outer configuration to the openings 50 in the upright flange 44 of the first portion 36. In this embodiment, the fasteners 54 are generally configured as bosses and thus circular, thereby forming a cylindrical or generally cylindrical projection. The fasteners 54 can be heat staked or snap fitted into the openings 50 in the first portion 36. Further as shown in FIG. 12, the second portion 38 can have a flange 80 at a first end 82 thereof to attach to a portion of the instrument panel 18 or other suitable structure and a flange 84 at a second end 86 thereof to mate with another portion of the instrument panel 18 and/or the center stack assembly 28.

Figure 4:
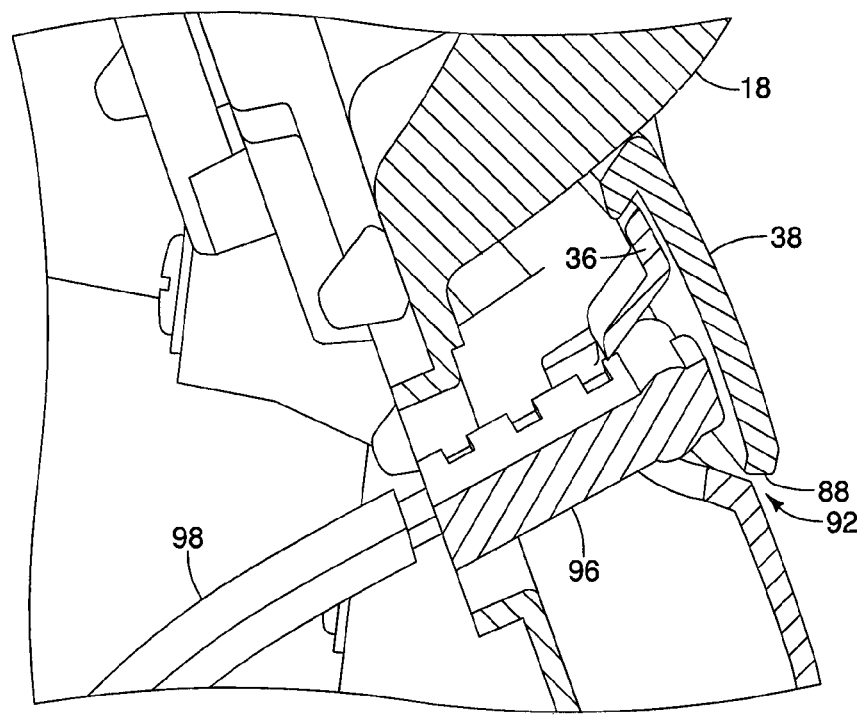
FIG. 4 is a side sectional view of the end of the lighting structure taken along lines 4-4 in FIG. 1.
Figure 5:
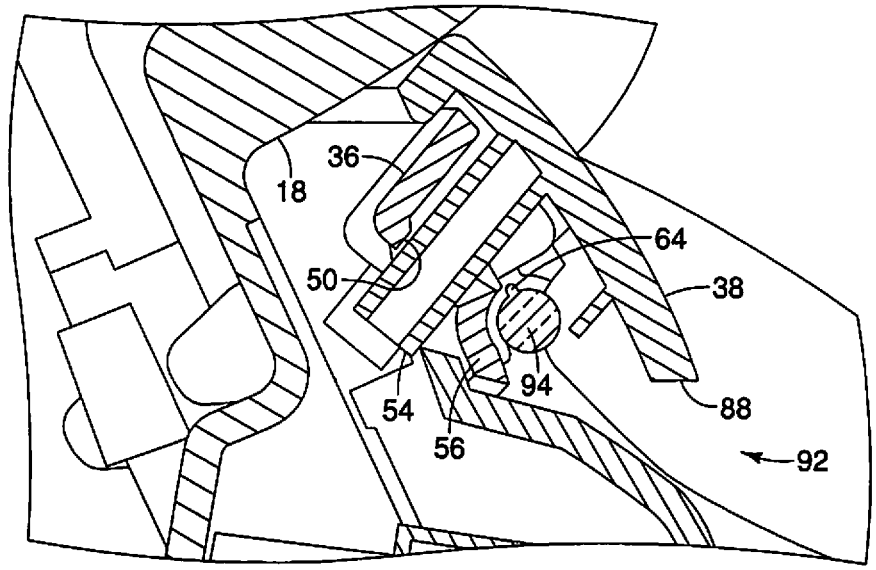
FIG. 5 is a side sectional view of the lighting structure taken along lines 5-5 in FIG. 1.
Figure 6:
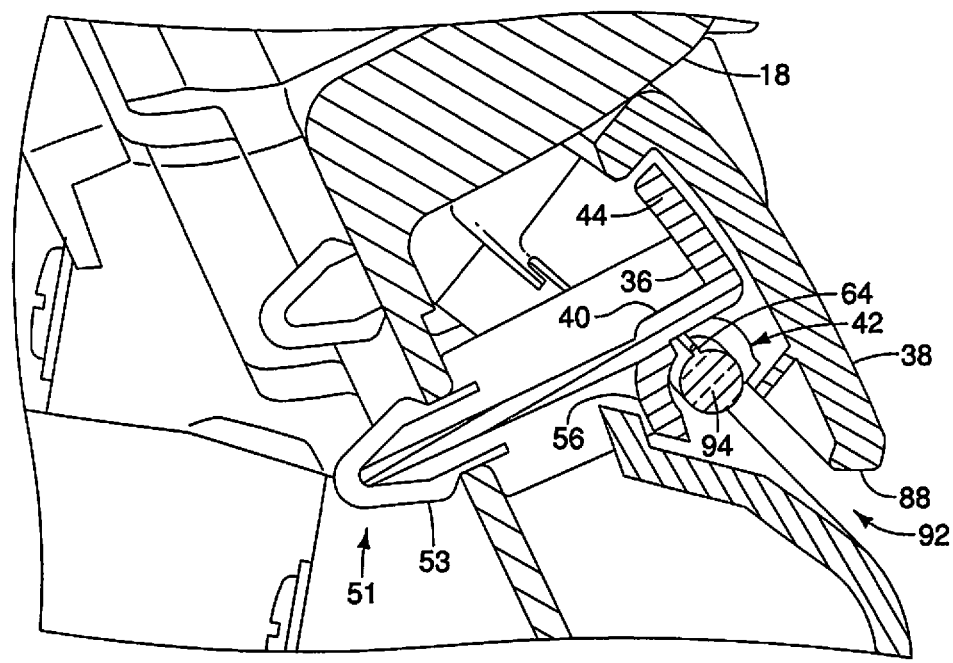
FIG. 6 is a side sectional view of the lighting structure taken along lines 6-6 in FIG. 1.

The second portion 38 includes a distal end 88, such that when the second portion 38 is coupled to the first portion 36 the distal end 88 is spaced from the retaining structure 42. Further, in one embodiment, the distal end 88 of the second portion 38 extends in a downward vehicle direction farther than the first portion 36 when the lighting structure 10 is attached to the instrument panel 18. This configuration of the first and second portion 36 and 38 conceals the retaining structure 42 in a longitudinal direction D of the vehicle 12 when the lighting structure 10 is attached to the instrument panel, as shown in FIGS. 4-6.

Moreover, the second portion 38 is configured to attach to the first portion 36 such that the elongated lighting element 94 is disposed between the first portion 36 and the second portion 38, when the elongated lighting element 94 is retained in the retaining structure 42 of the first portion 36. Since the distal end 88 of the second portion 38 is spaced from the retaining structure 42, the second portion 38 is similarly spaced from the elongated lighting element 94 and the first portion 36. This configuration forms a gap 92 between the first portion 36 and the second portion 38, as seen in FIGS. 2 and 4-6. This gap 92 enables light to emit from the elongated lighting element 94 into the passenger compartment 22 of the vehicle 12.

Figure 11:
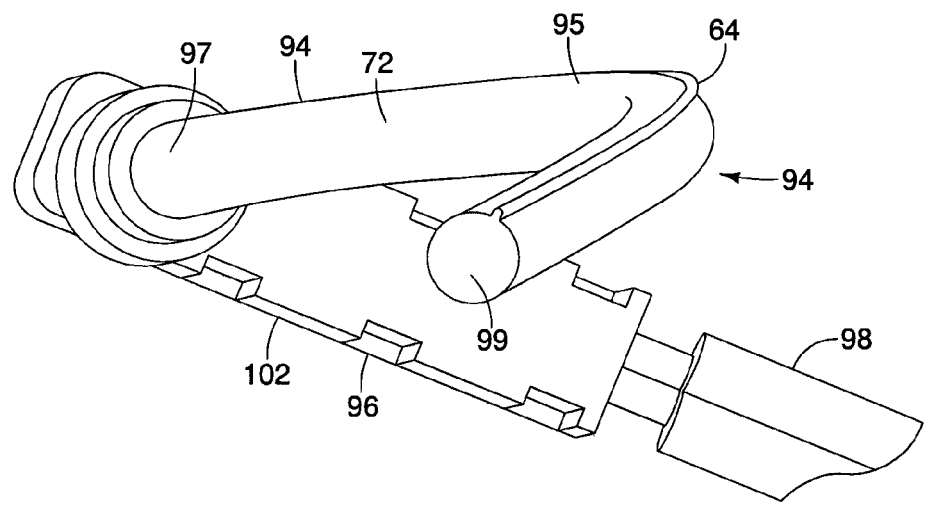
FIG. 11 is an enlarged view of the light source coupled to the lighting element.

As shown in FIGS. 8, 11 and 12, the lighting structure 10 includes elongated lighting element 94. The elongated lighting element 94 has a first end 97 and a second end 99, and can be a unitary flexible lighting pipe that is configured to emit light in a predetermined direction. For example, in one embodiment the elongated lighting element 94 can be an AMP LIGHT GUIDE produced by TYCO ELECTRONICS. Such directional lighting can be accomplished by the locating projection 64. The locating projection 64, in one embodiment, is a reflector strip on an exterior surface 95 of the elongated lighting element 94. In this embodiment, the locating projection 64 (i.e., the reflector strip) protrudes from the exterior surface 95 of the elongated lighting element 94, and extends along the length of the exterior surface 95 of the elongated lighting element 94 from the first end 97 to the second end 99, and is configured to direct light in the predetermined direction. The elongated lighting element 94 can be made from any suitable material, such as optical grade clear acrylic. This material enables the elongated lighting element 94 to be co-extruded with the locating projection 64. In one embodiment, the locating projection 64 is white and causes light to be emitted such that the light has a viewing angle of approximately 30 degrees (50% relative intensity) with a 180 degree radial direction.

As shown in FIGS. 10 and 11, the lighting structure 10 includes a light engine or source 96 that is coupled to the first portion 36. The light source 96 includes one or more individual sources of light that emit the light into the elongated lighting element 94. For example, the light source 96 may be a single light emitting diode or include a plurality of light emitting diodes. A single light source 96 may include more than one type of light generating component. Moreover, the light source 96 includes electrical wiring 98 with a connector 100 that enables the light source 96 to electrically couple to the vehicle electrical system. If desired, the light source 96 may be battery operated in addition to or rather than being electrically coupled to the vehicle electrical system.

The housing 102 of the light source 96 may be formed from a dielectric material such as a polymer. Alternatively, the housing 102 may be formed from a metal. The light source 96 preferably attaches to the first end 97 of the elongated lighting element 94, such that the elongated lighting element 94 is received in the housing 102 so as to secure the elongated lighting element 94 to the light source 96 and to orient the elongated lighting element 94 with respect to the light source 96 such that light emitted by the elongated lighting element 94 is directed in the desired or predetermined direction. The light source 96 emanates light toward the second end 99 of the elongated lighting element 94. The light is transmitted through the elongated lighting element 94 generally from the first end 97 toward the second end 99.

Figure 9:
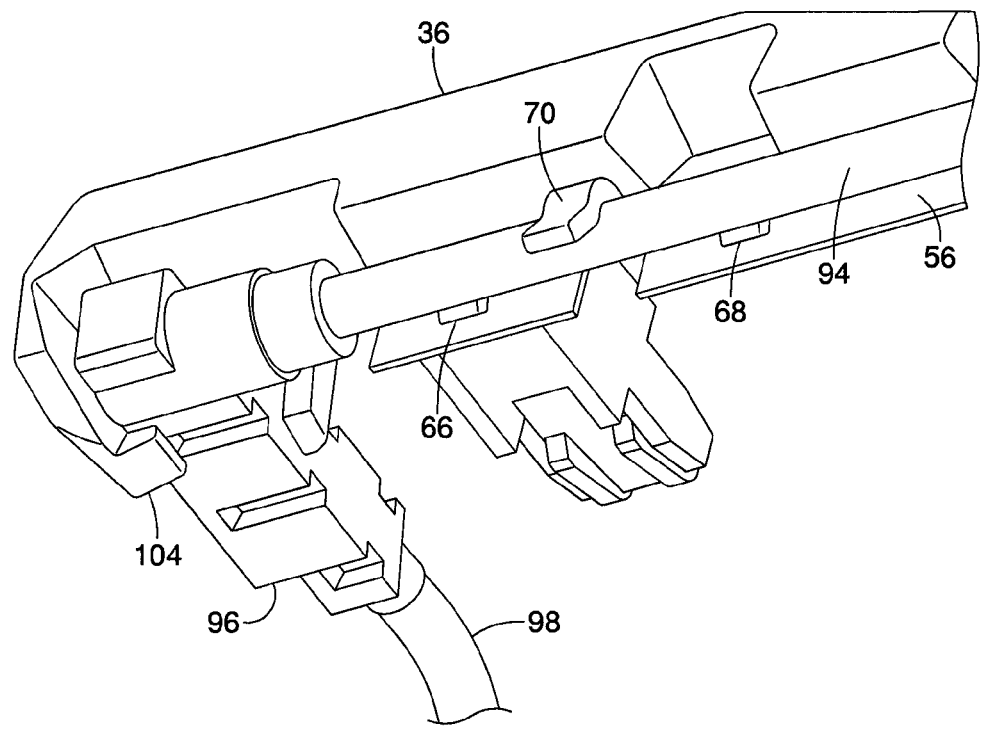
FIG. 9 is an enlarged view of the end of the lighting structure of FIG. 8, illustrating the light source coupled to the elongated lighting element.

As shown in FIGS. 11 and 12, the first end 97 of the elongated lighting element is connected to the light source 96. If desired, two light sources 96 can be coupled to the elongated lighting element 94 (e.g., a light source 96 coupled to each of the first and second ends 97 and 99). The elongated lighting element 94 and the light source 96 can then be coupled to the first portion 36. As described above, the locating projection 64 on the exterior surface 95 of the elongated lighting element 94 is inserted into the locating groove 62 in the retaining structure 42. The first, second and third retaining members 66, 68 and 70 engage or mate with the exterior surface 95 of the elongated lighting element 94 to securely attach the elongated lighting element 94 to the first portion 36, as shown in FIG. 10. At this time, the light source 96 can also be coupled the first portion 36 by a coupling member 104, as shown in FIG. 9.

The second portion 38 is then attached to the first portion 36 by inserting the fasteners 54 of the second portion 38 through the openings 50 in the upright flange 44 of the first portion 36. The fasteners 54 can then be heat staked to secure the second portion 38 to the first portion 36. FIG. 8 illustrates the first and second portions 36 and 38 coupled together with the elongated lighting element 94 and the light source 96 therebetween.

Figure 7:
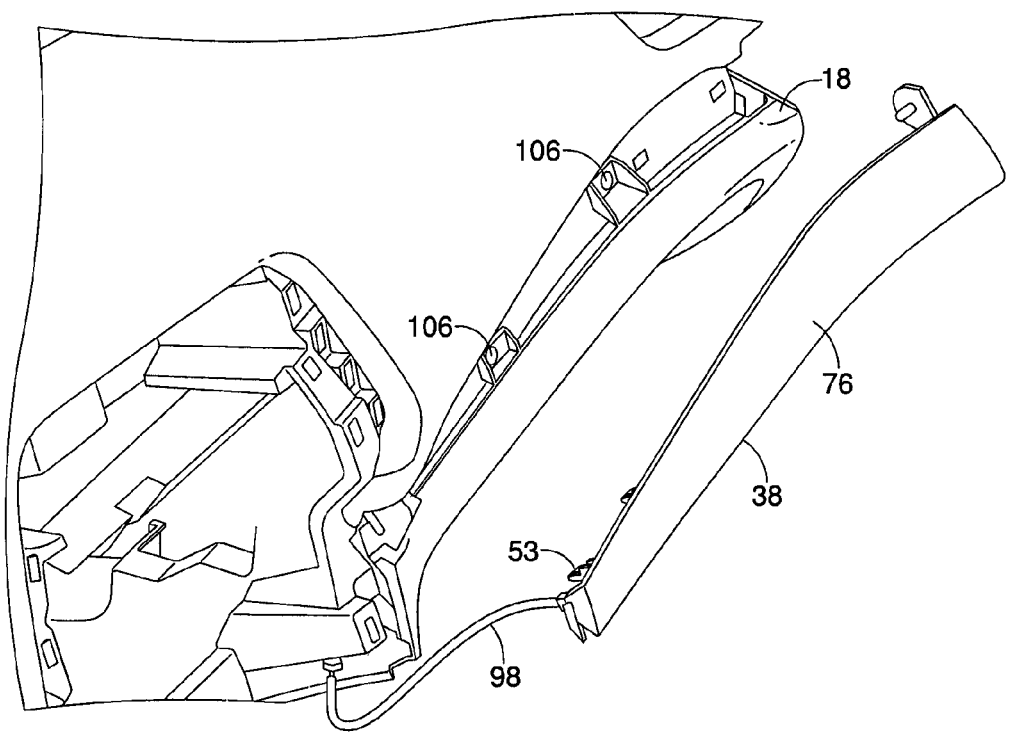
FIG. 7 is an exploded perspective view of the light structure and the instrument panel.

As shown in FIG. 7, the connector 100 for the light source 96 can be connected to the electrical system of the vehicle 12, and the lighting structure 10 can be attached to the vehicle 12 instrument panel 18. In one embodiment, the fastening elements 53 on the first portion 36 are snap fit into openings 106 in the instrument panel 18, securely fixing the lighting structure 10 to the instrument panel 18.

This structure produces a cost effective and easy to manufacture ambient lighting system that can be installed at any location within the interior of the vehicle 12. Moreover, the lighting structure 10 can then emit ambient light into the passenger compartment at any suitable time.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "front", "rear", "left", "right", "above", and "down", as well as any other similar directional terms refer to those directions of a vehicle equipped with the lighting structure. Accordingly, these terms, as utilized to describe the present invention should be interpreted relative to a vehicle equipped with the lighting structure.

The term "configured" as used herein to describe a component, section or part of a device includes hardware and/or software that is constructed and/or programmed to carry out the desired function.

The terms of degree such as "substantially" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A lighting structure, comprising:
    a first portion including a retaining structure configured to retain an elongated lighting element, and including a fastening structure configured to attach the lighting structure to an interior vehicle panel; and
    a second portion attached to the first portion at a location spaced from the retaining structure, with a distal end of the second portion being spaced from the retaining structure such that the second portion conceals the retaining structure in a longitudinal direction of a vehicle when the lighting structure is attached to the interior vehicle panel,
    the first portion comprising a base portion and an upright flange extending in an approximately perpendicular direction from the base portion, the retaining structure extending from the base portion.

2. The lighting structure according to claim 1, wherein the fastening structure includes is a snap fit fastener.

3. The lighting structure according to claim 1, wherein the second portion is configured to attach to the first portion such that the elongated lighting element is disposed between the first portion and the second portion, when the elongated lighting element is retained in the retaining structure of the first portion.

4. The lighting structure according to claim 1, wherein the retaining structure includes a plurality of retainers.

5. The lighting structure according to claim 1, wherein the second portion is configured to be heat staked to the first portion.

6. The lighting structure according to claim 1, wherein the retaining structure defines a locating groove configured to receive a locating projection on the elongated lighting element.

7. The lighting structure according to claim 1, wherein a distal end of the second portion extends in a downward vehicle direction farther than the first portion when the lighting structure is attached to the interior vehicle panel.

8. The lighting structure according to claim 1, wherein the second portion is configured to attach to the upright flange.

9. The lighting structure according to claim 1, further comprising the elongated lighting element retained by the retaining structure.

10. The lighting structure according to claim 1, wherein the interior vehicle panel is an instrument panel.

11. The lighting structure according to claim 6, wherein the retaining structure includes a first retaining member, a second retaining member and a third retaining member, the first retaining member being disposed on a surface of the first portion, the second retaining member being disposed on the surface of the first portion adjacent the first retaining member, and the third retaining member being positioned away from the surface of the first portion and being disposed between the first and second retaining members, and the locating groove is defined between the first retaining member and the third retaining member.

12. The lighting structure according to claim 8, wherein the upright flange is formed as a single piece with the first portion.

13. The lighting structure according to claim 11, wherein each of the first, second and third retaining members has an arcuate contact surface configured to mate with an outer contoured surface of the elongated lighting element.

14. An interior vehicle structure, comprising:
an interior trim panel;
an elongated lighting element;
a first portion including a fastening structure attached to the interior trim panel, the first portion including a retainer structure that retains the elongated lighting element on the first portion; and
a second portion attached to the first portion so as to be spaced from the elongated lighting element and substantially conceal the elongated lighting element in a longitudinal direction of the vehicle, with a distal end of the second portion being spaced from the interior trim panel so as to enable light from the elongated lighting element to pass between the distal end and the interior trim panel,
the first portion comprising a base portion and an upright flange extending in an approximately perpendicular direction from the base portion, the retaining structure extending from the base portion.

15. The interior vehicle structure according to claim 14, wherein
the elongated lighting element is a unitary flexible lighting pipe.

16. The interior vehicle structure according to claim 14, wherein
the elongated lighting element is configured to emit lighting in a predetermined direction.

17. The interior vehicle structure according to claim 14, wherein
the elongated lighting element includes a reflector strip on a surface thereof, the reflector strip protruding from the surface of the elongated lighting element and being configured to direct light in the predetermined direction.

18. The interior vehicle structure according to claim 14, wherein
the retaining structure includes a first retaining member, a second retaining member and a third retaining member, the first retaining member being disposed on a surface of the first portion, the second retaining member being disposed on the surface of the first portion adjacent the first retaining member, and the third retaining member being positioned away from the surface of the first portion and being disposed between the first and second retaining members.

19. The interior vehicle structure according to claim 14, wherein
the second portion is configured to attach to the first portion such that the elongated lighting element is disposed between the first portion and the second portion.

20. The interior vehicle structure according to claim 14, further comprising
a light source connected to one end of the elongated lighting element.

21. The interior vehicle structure according to claim 14, wherein the interior trim panel is an instrument panel.

22. The interior vehicle structure according to claim 17, wherein
the retaining structure defines a locating groove configured to receive the reflector strip.

* * * * *